US012473140B2

(12) United States Patent
Farhat

(10) Patent No.: US 12,473,140 B2
(45) Date of Patent: Nov. 18, 2025

(54) PROPORTIONALLY CONTROLLED CAP FOR SPRAY PAINT CANS

(71) Applicant: Jon A Farhat, Burbank, CA (US)

(72) Inventor: Jon A Farhat, Burbank, CA (US)

( * ) Notice: Subject to any disclaimer, the term of this patent is extended or adjusted under 35 U.S.C. 154(b) by 386 days.

(21) Appl. No.: 17/870,069

(22) Filed: Jul. 21, 2022

(65) Prior Publication Data

US 2024/0025629 A1 Jan. 25, 2024

(51) Int. Cl.
*B65D 83/16* (2006.01)
*B05B 1/12* (2006.01)
*B05B 1/30* (2006.01)

(52) U.S. Cl.
CPC .............. *B65D 83/164* (2025.01); *B05B 1/12* (2013.01); *B05B 1/3046* (2013.01)

(58) Field of Classification Search
CPC ........ B65D 83/207; B05B 1/12; B05B 1/3046
USPC ............... 239/583, 456; 222/20, 635, 402.24
See application file for complete search history.

(56) References Cited

U.S. PATENT DOCUMENTS 3,419,197 A * 12/1968 Battaglia .............. B65D 83/207 239/443
4,667,878 A * 5/1987 Behr ................... B05B 12/1418 239/125
5,271,537 A * 12/1993 Johnson ................ B05B 9/0894 222/509
2009/0272765 A1* 11/2009 Seki ..................... B65D 83/752 222/375
2023/0062171 A1 3/2023 Morrison

* cited by examiner

*Primary Examiner* — Jason J Boeckmann
(74) *Attorney, Agent, or Firm* — Chang & Hale LLP

(57) ABSTRACT

Described herein are proportionally controlled caps for spray paint cans that can provide a variety of spray effects and/or spread in the spray of paint without changing caps. The disclosed proportionally controlled caps include actuating elements that change the spread in spray paint to achieve a targeted spread. The cap includes an actuator button that is configured to move relative to a main body to cause a needle valve to change the spread in paint leaving the needle valve. The disclosed caps for spray paint cans can be configured to fit typical spray paint cans so that the disclosed caps can be used to replace the typical caps that come with spray paint cans, enabling typical spray paint cans to achieve a variety of spray effects and/or spreads in spray paint with a single cap.

18 Claims, 7 Drawing Sheets

PROPORTIONALLY CONTROLLED CAP FOR SPRAY PAINT CANS

BACKGROUND

Field

The present disclosure generally relates to spray paint cans and particularly to caps for spray paint cans.

Description of Related Art

Spray paints are typically contained in aerosol cans, which work by transforming liquefied paint and a propellant (e.g., compressed or liquefied gas) into a fine mist. Pressing down on a cap on the can causes a valve to be pressed down which in turn causes the liquid paint inside to move up a dip tube and to be projected from the cap. As the liquid paint exits the cap, the propellant mixed with the liquid paint rapidly expands into a gas causing the paint to atomize to form a spray.

SUMMARY

In some aspects, the techniques described herein relate to a proportionally controlled cap for a spray paint can, the cap including: a main body including a valve stem configured to mate with a corresponding valve feature on the spray paint can to allow paint to flow from the spray paint can to the proportionally controlled cap; an actuator button coupled to the main body, the actuator button configured to slide relative to the main body; and a needle valve coupled to the actuator button, the needle valve including a needle valve needle passing through a needle valve nozzle, wherein sliding the actuator button relative to the main body cause the needle valve needle to move within the needle valve nozzle to change a spray pattern exiting the needle valve.

In some aspects, the techniques described herein relate to a cap further including a valve chamber coupled to the needle valve, the valve chamber configured to hold paint for delivery out of the needle valve.

In some aspects, the techniques described herein relate to a cap further including a delivery tube that provides a conduit from the valve stem to the valve chamber to deliver paint from the spray paint can to the valve chamber.

In some aspects, the techniques described herein relate to a cap further including an O-ring seal configured to prevent paint from flowing from the valve chamber backward to the actuator button.

In some aspects, the techniques described herein relate to a cap, wherein sliding the actuator button along the main body toward the needle valve causes the spray pattern to narrow.

In some aspects, the techniques described herein relate to a cap, wherein sliding the actuator button along the main body away from the needle valve causes the spray pattern to widen.

In some aspects, the techniques described herein relate to a cap, wherein the actuator button is configured to slide while paint is exiting the needle valve to change the spray pattern while paint is exiting the needle valve.

In some aspects, the techniques described herein relate to a cap, wherein: the actuator button includes a cap slide rail; and the main body includes a bearing block forming a hole through which the cap slide rail is positioned, wherein moving the actuator button relative to the main body causes the cap slide rail to slide within the hole formed by the bearing block.

In some aspects, the techniques described herein relate to a cap, wherein the actuator button further includes a slide rail retainer band configured to retain the cap slide rail within the actuator button.

In some aspects, the techniques described herein relate to a cap, wherein the needle valve needle passes through the needle valve nozzle and is coupled to the actuator button such that movement of the actuator cap causes corresponding movement of the needle valve needle.

In some aspects, the techniques described herein relate to a cap further including a needle locking screw configured to secure the needle valve needle to the actuator button.

In some aspects, the techniques described herein relate to a cap, wherein: the needle valve nozzle forms a tapered inner cavity, the needle valve needle is tapered, and the tapering of the needle valve needle is configured to match the tapering of the inner cavity of the needle valve nozzle.

In some aspects, the techniques described herein relate to a cap, wherein, in a full forward position of the actuator button, the needle valve is closed due to the exterior of the needle valve needle being seated against the inner wall of the tapered inner cavity of the needle valve nozzle.

In some aspects, the techniques described herein relate to a cap, wherein sliding the actuator button relative to the main body away from the needle valve increases a distance between the exterior of the needle valve needle and the inner wall of the inner cavity of the needle valve nozzle.

In some aspects, the techniques described herein relate to a cap, wherein sliding the actuator button relative to the main body toward the needle valve decreases a distance between the exterior of the needle valve needle and the inner wall of the inner cavity of the needle valve nozzle.

In some aspects, the techniques described herein relate to a cap, wherein the angle of tapering of the needle valve needle and the inner cavity of the needle valve nozzle affects a spray pattern of paint leaving the needle valve.

In some aspects, the techniques described herein relate to a spray paint can including a can holding spray paint and the proportionally controlled cap.

In some aspects, the techniques described herein relate to a spray paint can, wherein pressing down on the proportionally controlled cap causes paint to enter the proportionally controlled cap from the spray paint can.

In some aspects, the techniques described herein relate to a spray paint can, wherein, while pressing down on the proportionally controlled cap, sliding the actuator button relative to the main body toward the needle valve causes the spread of the spray paint leaving the proportionally controlled cap to narrow.

In some aspects, the techniques described herein relate to a spray paint can, wherein, while pressing down on the proportionally controlled cap, sliding the actuator button relative to the main body away from the needle valve causes the spread of the spray paint leaving the proportionally controlled cap to widen.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

DETAILED DESCRIPTION OF SOME EMBODIMENTS

Figure 1A:
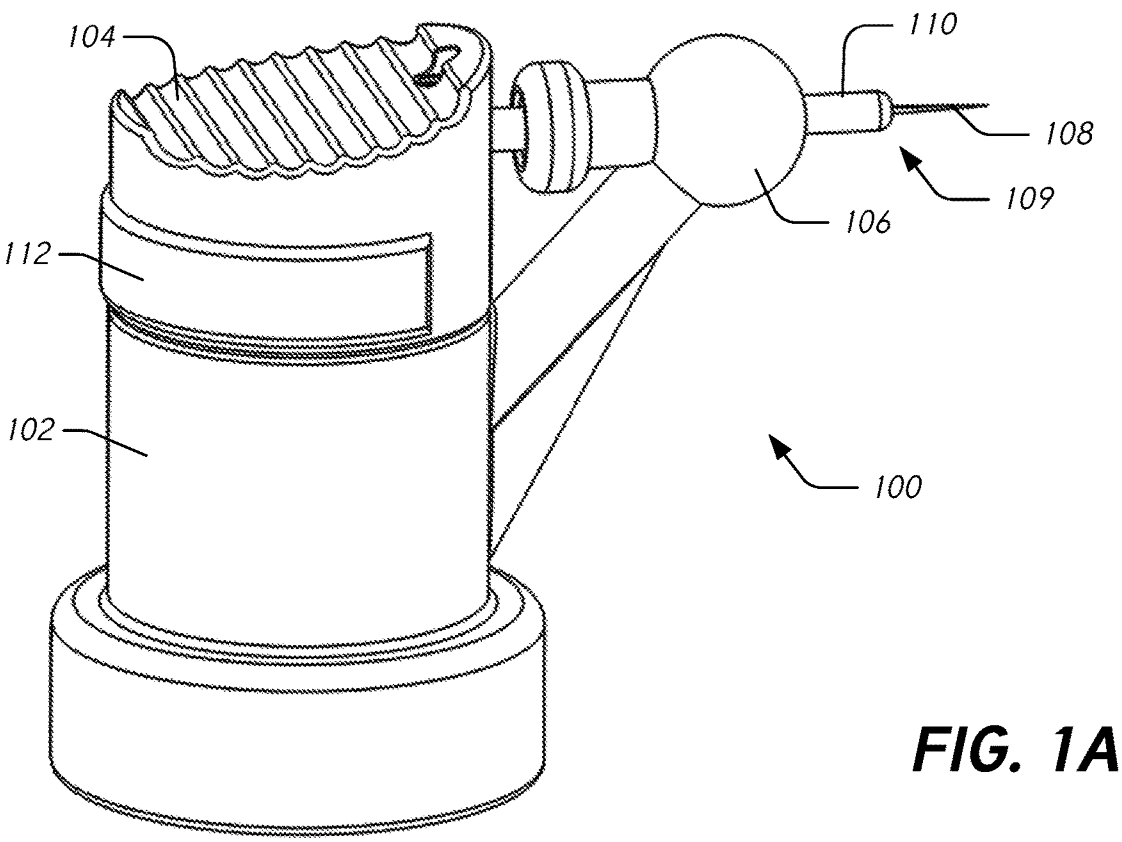
FIGS. 1A and 1B illustrate an example proportionally controlled cap for a spray paint can.

The headings provided herein, if any, are for convenience only and do not necessarily affect the scope or meaning of the claimed subject matter.

Overview

Spray paints are liquid paints that are contained in an aerosol can. A can of spray paint includes a button, or cap, on the top that dispenses paint when pressed down. Spray paint cans work by using compressed or liquefied gas as a propellant. The propellant in the spray paint becomes a vapor when the valve is opened and the pressure inside the can is released, the vapor mixing with the liquid paint to atomize the paint to produce a spray or mist of paint. Typically, the paint and gas are added into the spray paint can in liquid form. Inside a spray paint can, liquid paint is mixed with compressed gas where the compressed gas remains in liquid form when it is at or near room temperature. When the cap of a spray paint can is pressed, it opens the valve system of the can which changes the air pressure inside the can. This change in pressure causes the liquefied gas to boil and to become a vapor. Pressing the cap also siphons gas through the hole of the cap, releasing the vaporized paint and creating the spray effect.

There are different types of spray paint caps or nozzles that change the spread of spray paint. Female and male caps are broad categories of caps that contain a hole or a stem, respectively, at the base, which attaches to a complementary component of the spray paint can (i.e., a stem at the valve of a "male" spray paint can mates with a female cap and a hole in the valve of a female spray paint can). Thin caps are used to spray thin lines and highlights, which may be used in spray paint art. Outline caps are medium-sized spray caps that are typically used to paint clear solid lines. Fat caps are used to cover and fill in large areas and super fat caps are used to fill in larger areas because they have a greater spread than fat caps. Calligraphy caps have a flattened edge and can be used for painting calligraphy lines. Needle caps have long, needle-shaped nozzles that are used to create a splatter effect. Stencil caps have a fine point hole used for fine detail.

To achieve a variety of different spray effects or spreads in the spray of paint with the same spray paint can, it would typically be required to change caps to achieve each different desired spray effect. This may be undesirable due at least in part to the time required to switch between caps and the cost required to acquire multiple different caps. Accordingly, to address these and other issues, described herein are proportionally controlled caps for spray paint cans that can provide a variety of spray effects and/or spread in the spray of paint without changing caps. The disclosed proportionally controlled caps include actuating elements that change the spread in spray paint to achieve a targeted spread. The cap includes an actuator button that is configured to move relative to a main body to cause a needle valve to change the spread in paint leaving the needle valve. The movement of the actuator button relative to the main body causes a corresponding change in the spread of the paint leaving the cap. Thus, the disclosed caps may be referred to as proportionally controlled caps or variably controlled caps. The disclosed caps for spray paint cans can be configured to fit typical spray paint cans so that the disclosed caps can be used to replace the typical caps that come with spray paint cans, enabling typical spray paint cans to achieve a variety of spray effects and/or spreads in spray paint with a single cap. In addition, the disclosed caps for spray paint cans can be configured to achieve a fine stream of paint (e.g., a relatively narrow spread) that is not achievable with typical caps for spray paint cans and are typically only achievable with an airbrush.

Advantageously, unlike typical caps for spray paint cans that rely on a single button push to deliver a prescribed stream of paint, the disclosed proportionally controlled caps for spray paint cans can be configured to emulate a familiar airbrush action by allowing a down and pull back action to vary the volume and diameter of the paint stream exiting the spray paint can. This is in contrast to typical caps for spray paint cans that have an on/off mode in response to pushing the cap down. To achieve a different spray pattern with a typical spray paint can, the user would have to change caps or would have to use an expensive airbrush instead. Advantageously, the disclosed proportionally controlled caps are configured to replace typical caps on a standard spray paint can thereby allowing a user to achieve control over the spray pattern in a relatively easy and inexpensive manner. Another advantage is that, unlike typical airbrushes that use separate air and paint feeds, a spray paint can delivers pressurized gas and paint in a single output. When paired with a disclosed variable control cap, the cap can be pressed down to allow the gas to expand and mix with the paint, pulling back on the button then delivers a stream of paint with a variable size and volume, emulating the functionality of an airbrush using a standard spray paint can.

Example Proportionally Controlled Caps for Spray Paint Cans

Figure 1B:
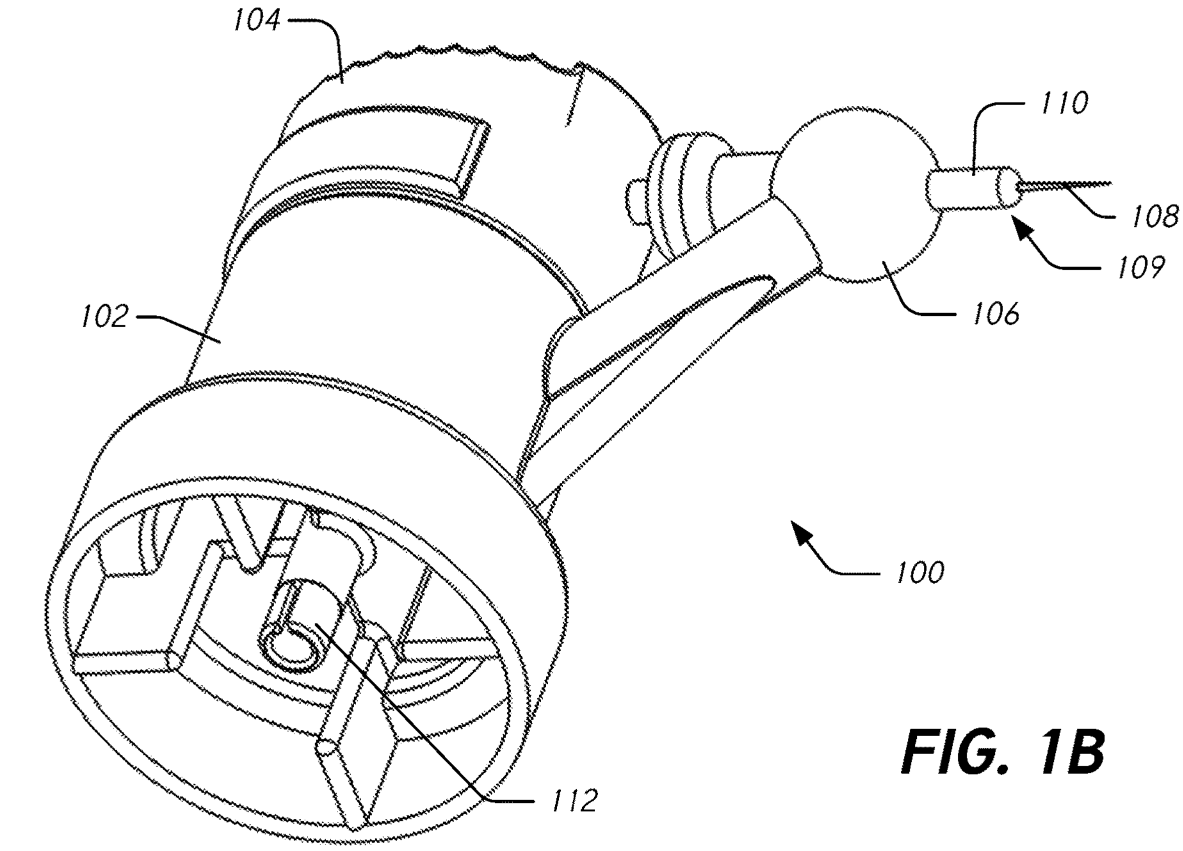

FIGS. 1A and 1B illustrate an example proportionally controlled cap 100 for a spray paint can. The proportionally controlled cap 100 includes a main body 102 and an actuator button 104 coupled to the main body 102. The actuator button 104 is coupled to the main body 102 in a manner that allows the actuator button 104 to be pressed down and to slide forward and backward along the main body 102, as described in greater detail herein. The proportionally controlled cap 100 includes a valve stem 112 configured to mate with a corresponding or complementary component of a spray paint can. By way of example, the valve stem 112 can be configured to mate with a female spray paint can or it can be configured to mate with a male spray paint can and may not be a stem but may be another suitable complementary feature. Mating or connecting the proportionally controlled cap 100 to the spray paint can causes the valve stem 112 to couple with a tube or other element from the spray paint can to allow paint to flow from the spray paint can to the proportionally controlled cap 100. It should be understood that the proportionally controlled cap 100 can be used with other aerosol cans in addition to spray paint cans to provide proportionally or variably controlled spray patterns, which may be beneficial in other arenas in addition to spray painting.

Pressing down on the actuator button 104 causes liquid paint and the propellant in the spray paint can coupled to the proportionally controlled cap 100 to flow up the proportionally controlled cap 100 into a valve chamber 106. Sliding the actuator button 104 forward and backward along the main body 102 causes a needle valve nozzle 110 to move relative to a needle valve needle 108. Together, the needle valve needle 108 and the needle valve nozzle 110 form a needle valve 109. In some embodiments, the needle valve needle 108 is fixed relative to the actuator button 104. The result of the relative motion is that more or less of the needle valve needle 108 is exposed changing the spread of paint leaving the needle valve nozzle 110. In some embodiments, when the actuator button 104 is in a most forward position (e.g., closest to the needle valve needle 108), the spread of paint leaving the needle valve nozzle 110 is at a minimum and when the actuator button 104 is in a most rear position, the spread of paint leaving the needle valve nozzle 110 is at a maximum.

Figure 2:
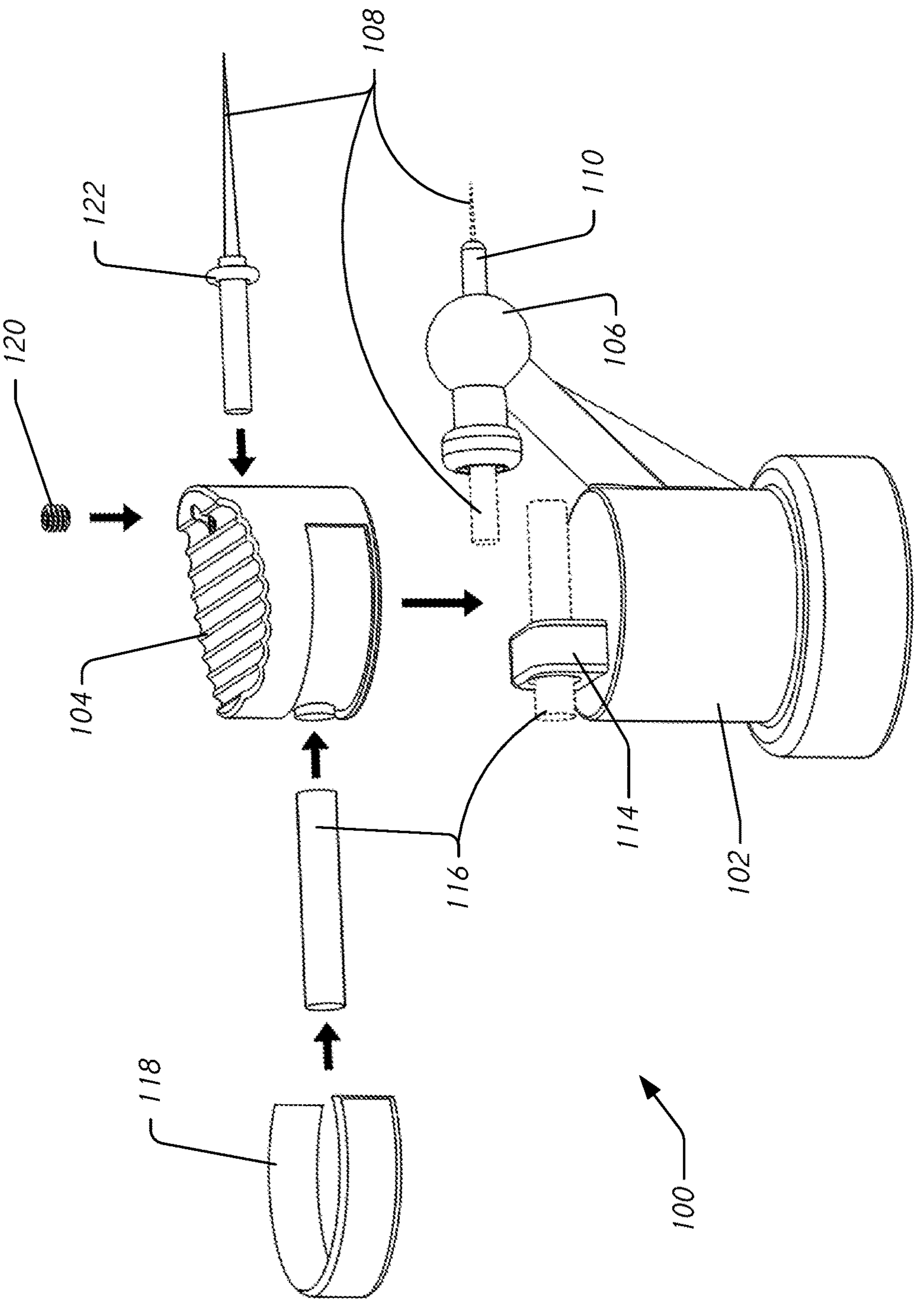
FIG. 2 illustrates an exploded view of the cap of FIGS. 1A and 1B.

FIG. 2 illustrates an exploded view of the proportionally controlled cap 100 of FIGS. 1A and 1B. The exploded view exposes additional components of the proportionally controlled cap 100 that provide the functionality described herein. The proportionally controlled cap 100 includes a bearing block 114 that is part of the main body 102. The proportionally controlled cap 100 also includes a cap slide rail 116 that is coupled to the actuator button 104. The cap slide rail 116 is slidably coupled through a hole of the bearing block 114 so that the cap slide rail 116 can translate relative to the bearing block 114. In turn, this allows the actuator button 104 to slide forward and backward relative to the main body 102. The proportionally controlled cap 100 also includes a slide rail retainer band 118 to retain the cap slide rail 116 within the actuator button 104.

The needle valve needle 108 is coupled to the actuator button 104 and is configured to slide within the needle valve nozzle 110. Thus, sliding the actuator button 104 relative to the main body 102 causes the cap slide rail 116 to slide relative to the bearing block 114 which in turn causes the needle valve needle 108 to slide relative to the needle valve nozzle 110.

The proportionally controlled cap 100 also includes a needle locking screw 120 that is configured to help keep the needle valve needle 108 in place within the actuator button 104. The needle locking screw 120 does this by being able to be tightened to contact and place pressure on the needle valve needle 108. The needle locking screw 120 can also be configured to be loosened and tightened to facilitate removal and/or replacement of needle valve needles.

The proportionally controlled cap 100 also includes an O-ring seal 122 that is configured to reduce or prevent backflow of paint from the valve chamber 106 toward the actuator button 104. The needle valve needle 108 is configured to pass through the O-ring seal 122 and to move relative to the O-ring seal 122. The o-ring seal 122 is configured to surround the needle valve needle 108 to prevent paint that is designed to exit the needle valve nozzle 110 from passing backward through the o-ring seal 122 toward the actuator button 104.

Replacing Typical Spray Paint can Caps with Proportionally Controlled Caps

Figure 3A:
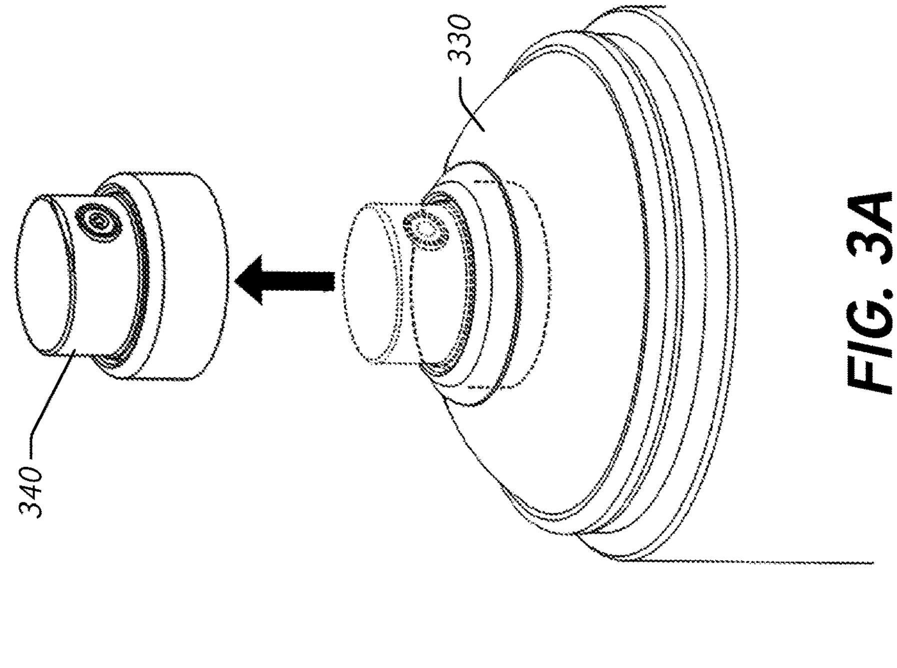
FIGS. 3A, 3B, 3C, 3D, and 3E illustrate an example of replacing a typical cap on a spray paint can with a proportionally controlled cap, examples of which are described herein.
Figure 3B:
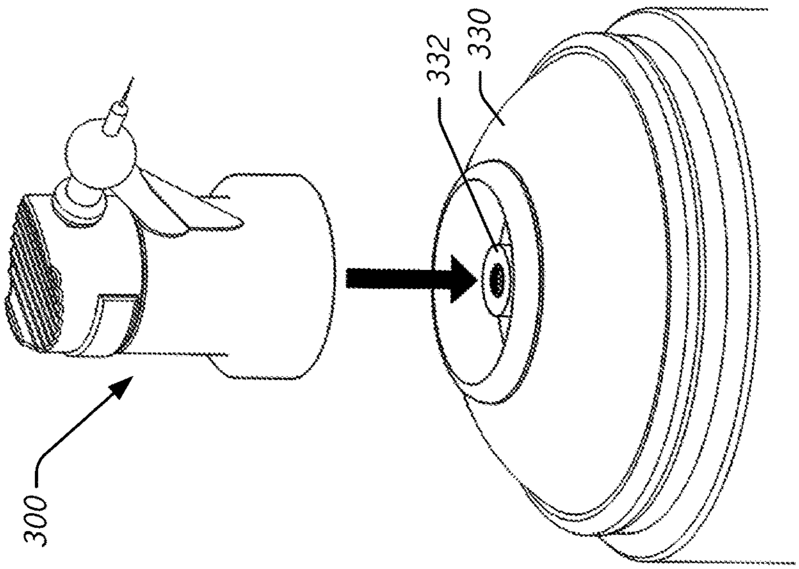
Figure 3C:
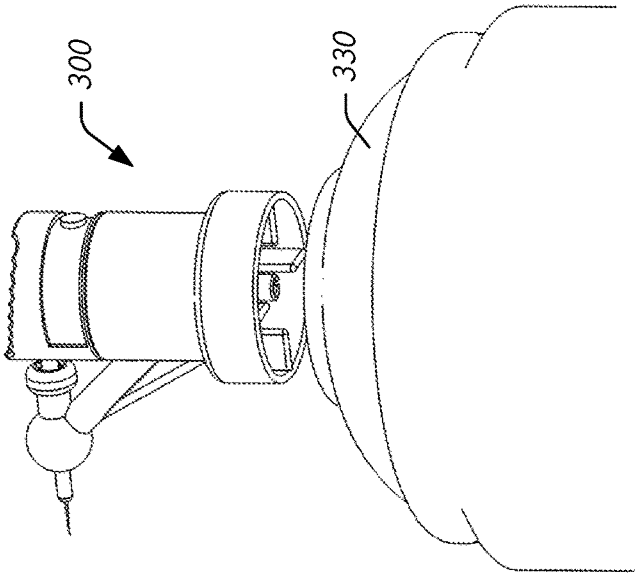
Figure 3E:
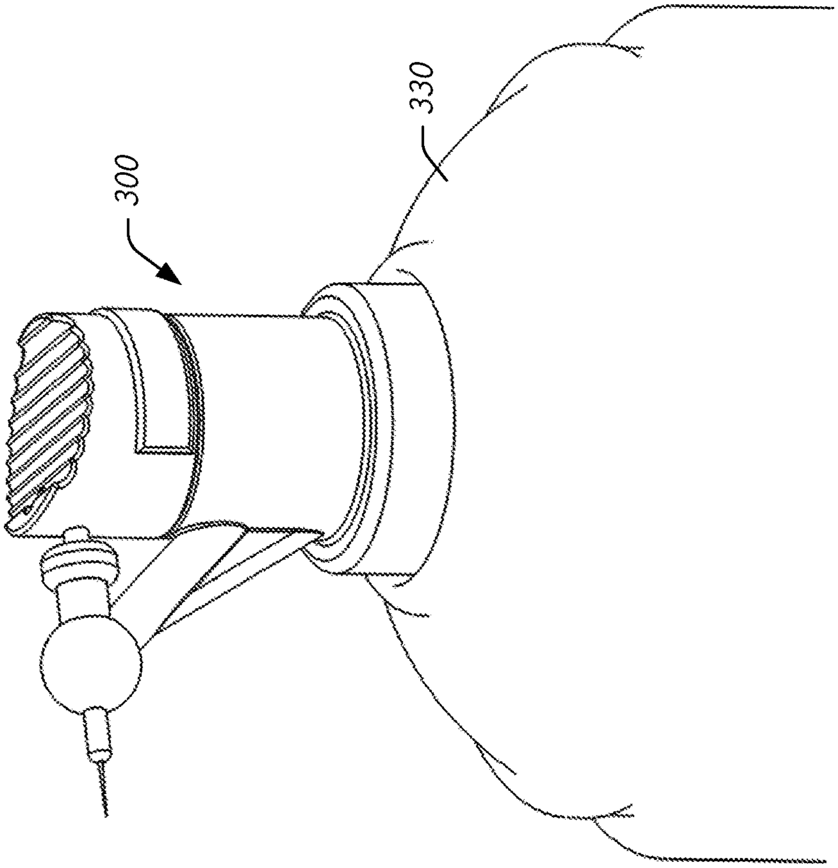
Figure 3D:
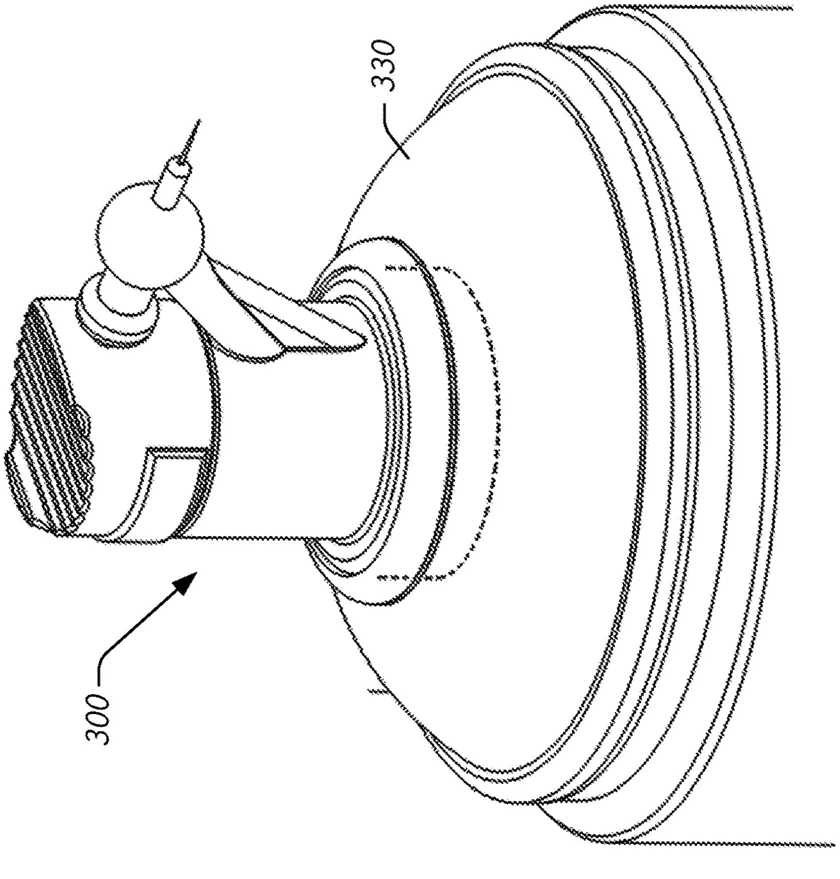

FIGS. 3A, 3B, 3C, 3D, and 3E illustrate an example of replacing a typical cap 340 on a spray paint can 330 with a proportionally controlled cap 300, examples of which are described herein. FIG. 3A illustrates the spray paint can 330 with the typical cap 340 being removed from the spray paint can 330. Once removed, as illustrated in FIGS. 3B and 3C, the proportionally controlled cap 300 can be installed by mating a valve stem (e.g., the valve stem 112 in FIG. 1B) to the corresponding valve hole 332 of the spray paint can 330. FIGS. 3D and 3E illustrate the proportionally controlled cap 300 installed on the spray paint can 330. With the proportionally controlled cap 300 installed on the spray paint can 330, spray paint can be dispersed with a variety of spreads or spray patterns by pressing down the actuator button and sliding it backward and forward relative to the main body of the proportionally controlled cap 300.

Providing a Variety of Spray Effects with Proportionally Controlled Caps

Figure 4A:
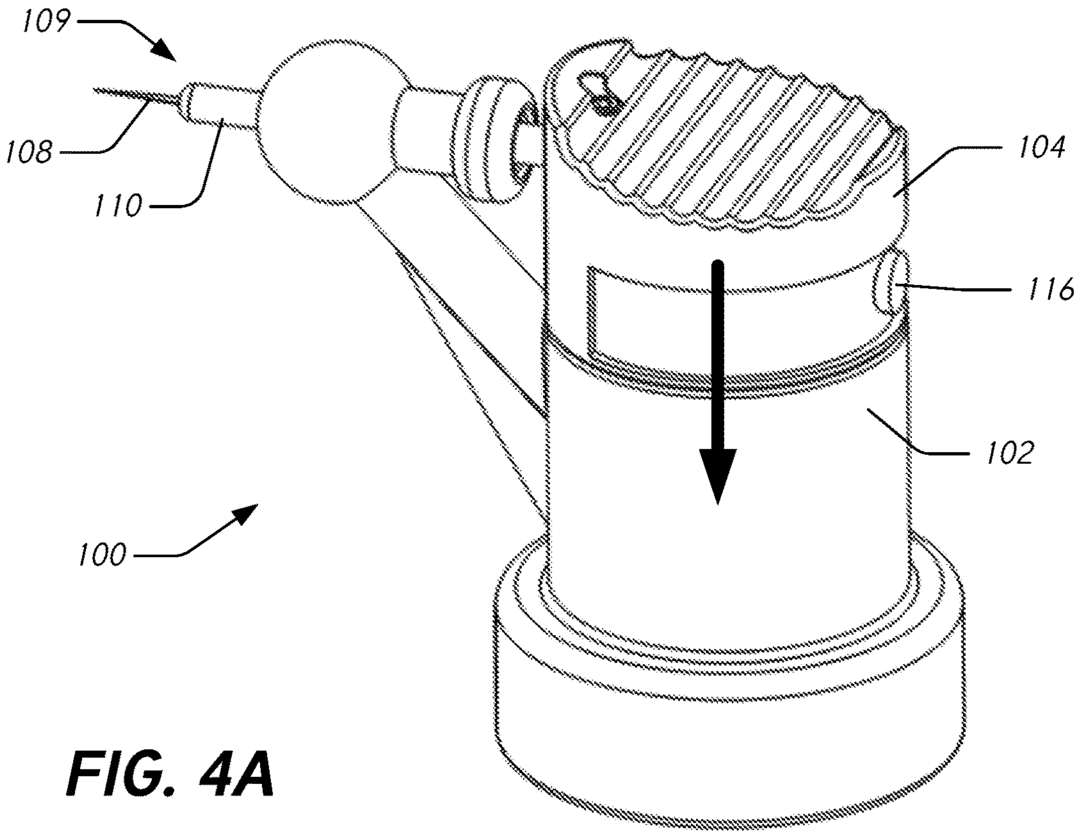
FIGS. 4A and 4B illustrate how to achieve a variety of spray effects using the proportionally controlled cap of FIGS. 1A, 1B and 2
Figure 4B:
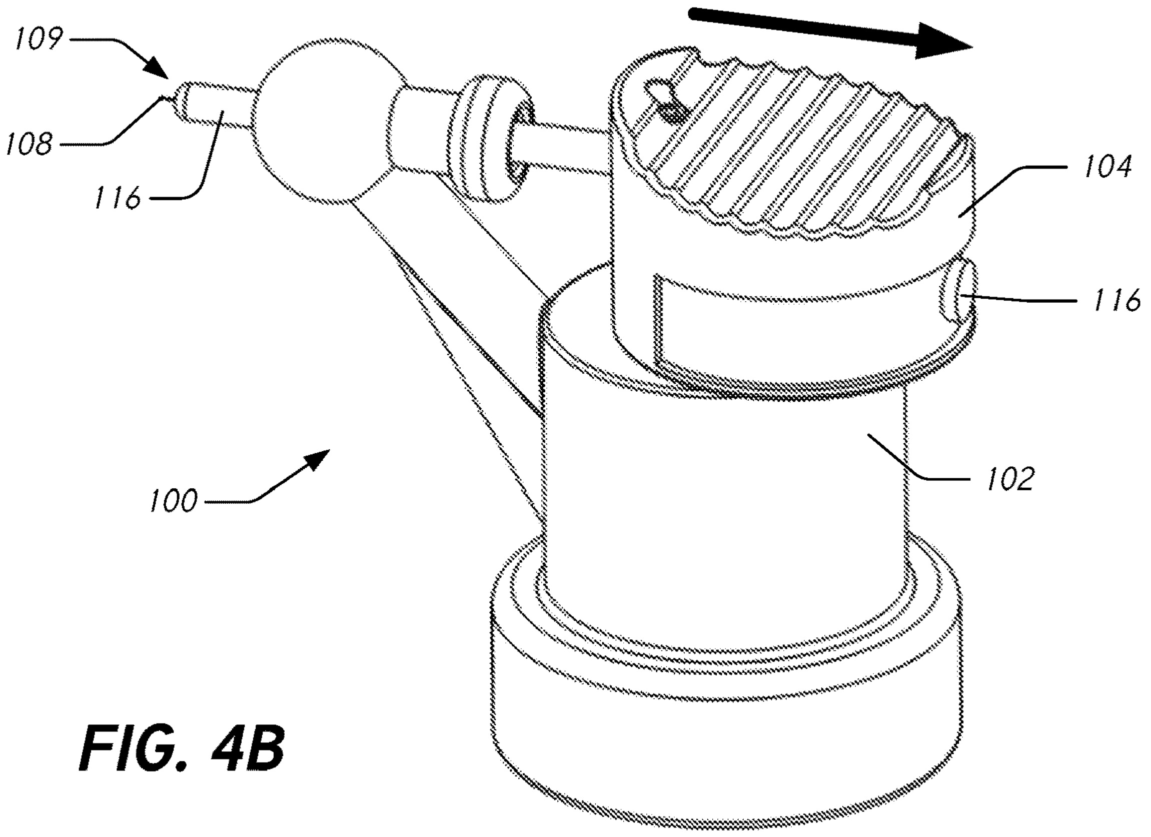

FIGS. 4A and 4B illustrate how to achieve a variety of spray effects using the proportionally controlled cap 100 of FIGS. 1A, 1B and 2. The proportionally controlled cap 100 for a spray paint can includes the actuator button 104 that can be actuated to provide a variety of spray effects. In a forward position, as illustrated in FIG. 4A, the actuator button 104 is slid forward to a forward limit or near a forward limit of travel of the actuator button 104 relative to the main body 102. In this forward position, the spread of spray paint is at or near its narrowest. In a rear position, as illustrated in FIG. 4B, the actuator button 104 is slid backward to a rear limit or near a rear limit of travel of the actuator button 104 relative to the main body 102. In this rear position, the spread of spray paint is at or near its widest. The actuator button 104 can also be positioned along any position between the forward position and the rear position to achieve spreads in spray paint that vary between the narrowest spread in the forward position and the widest spread in the rear position.

In some embodiments, the amount of travel between the main body 102 and the actuator button 104 is determined or influenced by the cap slide rail 116 and the bearing block 114. For example, the length of the cap slide rail 116 can be a limiting factor for determining the amount of travel of the actuator button 104 relative to the main body 102. The cap slide rail 116 is fixed within the actuator button 104 using the slide rail retainer band 118 and internal structures of the actuator button 104 and is positioned in a hole of the bearing block 114 such that the actuator button 104 is configured to slide a distance approximately equal to the length of the cap slide rail 116 or the exposed length of the cap slide rail 116, which is adjusted based on the amount of the cap slide rail 116 covered by internal structures of the actuator button 104 to secure the cap slide rail 116 within the actuator button 104. This distance is also related to the resulting spray patterns or spreads in spray leaving the needle valve nozzle 110 due at least in part to the travel of the needle valve needle 108 within the needle valve nozzle 110. In the rear position, a relatively small portion of the needle valve needle 108 protrudes from the needle valve nozzle 110 causing the spray pattern to be its widest whereas in the forward position, a relatively large portion of the needle valve needle 108 protrudes from the needle valve nozzle 110 causing the spray pattern to be its narrowest, as described herein.

To use the proportionally controlled cap 100, the actuator button 104 can be pushed forward while being pressed down (as illustrated in FIG. 4A). Pressing down causes the whole proportionally controlled cap 100 to move downward. This downward motion results in the same effect as pressing down on a typical cap for a spray paint can in that it releases paint from the spray paint can. In this configuration, the needle valve 109 (comprising the needle valve needle 108 and the needle valve nozzle 110) is closed thereby restricting paint flow by narrowing the spread and reducing the volume of paint leaving the spray paint can. The actuator button 104 can be pulled back while still pressing down (as illustrated in FIG. 4B). This action causes the needle valve 109 to open to increase the spread and increase the volume of paint leaving the spray paint can. This action effectively increases the opening of the needle valve nozzle 110 which results in the increases in spray paint spread and volume.

The actuator button 104 is configured to remain where the user positions it, being neither biased toward the forward position nor the rear position. Thus, once a user finds a desirable spray pattern, the actuator button 104 can be left in the desired position that results in the desirable spray pattern. However, in some embodiments, the actuator button 104 can be biased to a particular position (e.g., the forward or rear positions) using springs or other mechanisms. In certain instances, a natural position to leave the actuator button 104 may be in the forward position and the proportionally controlled cap 100 can be configured to click forward to close.

The actuator button 104 can be slid forward and backward while the actuator button 104 is not being pressed down. In this way, a user can select a targeted position for the actuator button 104 prior to pushing down to release paint.

In some embodiments, the proportionally controlled cap 100 is approximately 1.5 inches tall, approximately 0.75 inches wide at the main body 102, and approximately 1 inch wide at the base of the main body 102. In some embodiments, the proportionally controlled cap 100 can be configured to be roughly the same size as a typical cap except that is about 2-3 times taller with an arm (e.g., the needle valve needle 108 and needle valve nozzle 110) extending from the cap. In some embodiments, the proportionally controlled cap 100 can be configured to be easily disassembled to facilitate cleaning. In some embodiments, the proportionally controlled cap 100 is a disposable component.

Figure 5A:
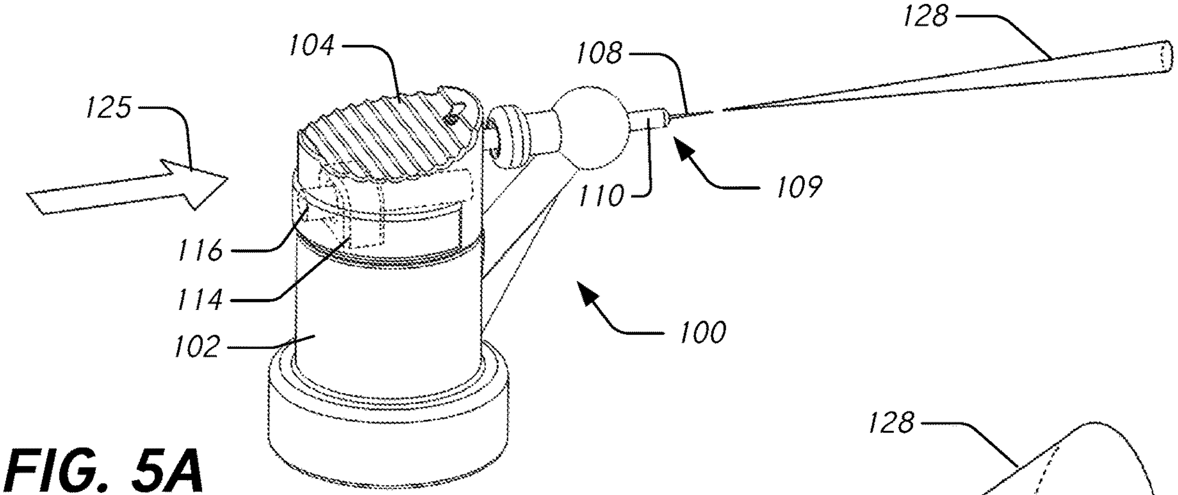
FIGS. 5A, 5B, 5C, and 5D illustrate the mechanism for achieving the variety of spray effects with the proportionally controlled cap of FIGS. 1A, 1B, and 2.
Figure 5B:
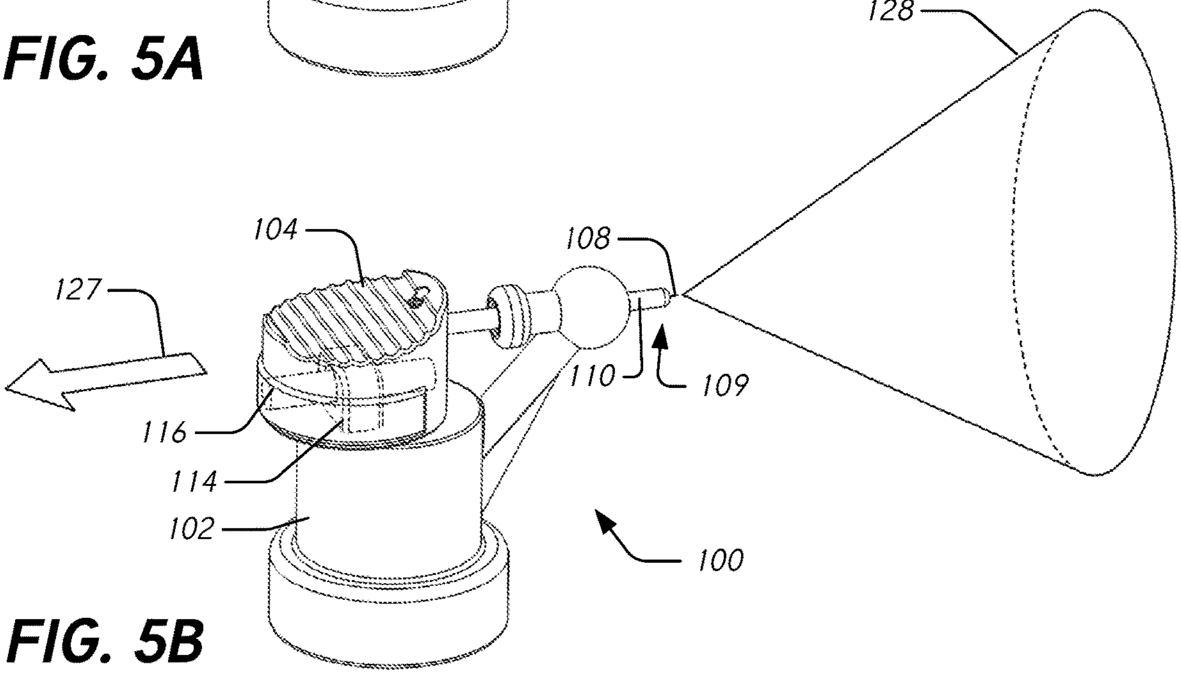

FIGS. 5A, 5B, 5C, and 5D illustrate the mechanism for achieving the variety of spray effects with the proportionally controlled cap of FIGS. 1A, 1B, and 2. Pushing the actuator button 104 forward (while also pressing down), as indicated by arrow 125 in FIG. 5A, causes the actuator button 104 to slide forward along the main body 102 which causes the needle valve needle 108 to increase the amount it protrudes from the needle valve nozzle 110 thereby narrowing the spray pattern 128. Pushing or pulling the actuator button 104 backward (while also pressing down), as indicated by arrow 127 in FIG. 5B, causes the actuator button 104 to slide backward along the main body 102 which causes the needle valve needle 108 to decrease the amount it protrudes from the needle valve nozzle 110 thereby widening the spray pattern 128. FIGS. 5A and 5B illustrate that the cap slide rail 116 slides within the bearing block 114 to enable the actuator button 104 to slide back and forth along the main body 102.

Figure 5C:
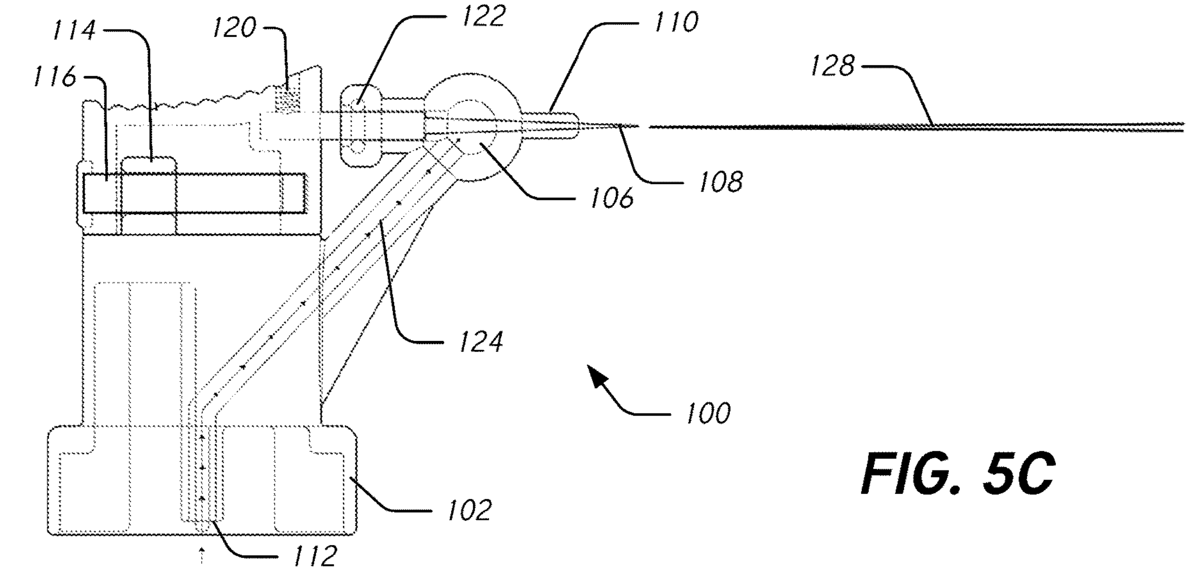
Figure 5D:
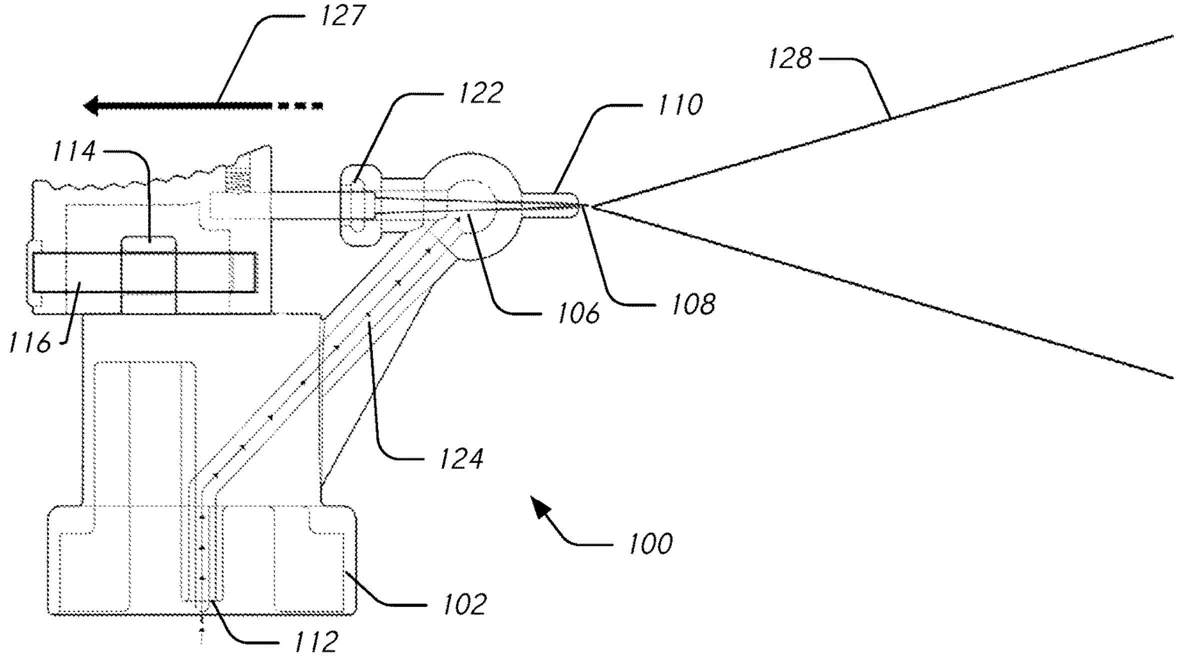

Cut away views of the proportionally controlled cap 100 are illustrated in FIGS. 5C and 5D. FIG. 5C illustrates the proportionally controlled cap 100 in a forward position with a narrow spray pattern 128. FIG. 5D illustrates the proportionally controlled cap 100 being slid backward to widen the spray pattern 128, as described herein. The cut away views illustrate that a delivery tube 124 runs from the valve stem 112 in the main body 102 to the valve chamber 106, the delivery tube 124 configured to deliver paint from the spray paint can to the valve chamber 106 when the proportionally controlled cap 100 is pressed down. The delivery tube 124 is configured to provide a conduit from the valve stem 112 to the valve chamber 106 to deliver paint from the spray paint can to the valve chamber 106. The valve chamber is configured to hold paint for delivery out of the needle valve 109.

The cut away view shows that the needle valve needle 108 is coupled to the actuator button 104. The needle locking screw 120 is configured to secure the needle valve needle 108 to the actuator button 104.

As described herein, a typical airbrush works by pushing a button down to get air and by pulling back to adjust the size of the output spray pattern. Here, the proportionally controlled cap 100 operates in a similar manner wherein pressing down on the proportionally controlled cap 100 causes paint to be delivered to the valve chamber 106 where it is then released in a targeted spray pattern 128 by sliding the actuator button 104 relative to the main body 102. The needle valve 109 changes the spray pattern 128 based on the position of the actuator button 104 to the main body 102. The release of spray paint can be instantly started by pressing down on the actuator button 104 and can be instantly stopped by releasing the actuator button 104.

The needle valve 109 and O-ring seal 122 are configured to seal the needle valve needle 108 to reduce or prevent backward paint flow. As paint is delivered up the delivery tube 124, the valve chamber 106 fills with paint. In some embodiments, when the actuator button 104 is in a full forward position the needle valve 109 is closed, not allowing any point to exit the needle valve 109. Pulling the actuator button 104 back even a little from this full forward position begins to open the needle valve 109 to allow a narrow stream of paint to exit (e.g., as illustrated in FIG. 5C). Pulling back more, as indicated by arrow 127 in FIG. 5C, increases the amount the needle valve 109 is opened, resulting in more paint volume exiting and increasing the spread of the spray pattern 128.

The needle valve needle 108 is tapered to form the needle shape of the needle valve needle 108. Similarly, the needle valve nozzle 110 forms a cavity that is tapered, with a wider portion towards the rear of the needle valve nozzle 110 and a narrower portion at the front of the needle valve nozzle 110. The tapering of the needle valve needle 108 is configured to match the tapering of the cavity of the needle valve nozzle 110. Thus, in the full forward position the needle valve needle 108 fits in the tapered cavity of the needle valve nozzle 110 in such a way that the exterior of the needle valve needle 108 contacts the inner wall of the tapered cavity of the needle valve nozzle 110. This closes the needle valve 109. In other words, the needle valve 109 is closed due to the exterior of the needle valve needle 108 being seated against the inner wall of the tapered inner cavity of the needle valve nozzle 110. Pulling the actuator button 104 back causes the needle valve needle 108 to move backward relative to the needle valve nozzle 110, which results in a separation between the exterior of the needle valve needle 108 and the inner wall of the tapered cavity of the needle valve nozzle 110 which allows paint to begin to exit the needle valve 109. In this forward position, a relatively large portion of the needle valve needle 108 is protruding from the needle valve nozzle 110 and there is a relatively small gap between the needle valve needle 108 and the cavity of the needle valve nozzle 110. The result is that a relatively small volume of paint exits the valve chamber 106 in a relatively narrow spread (e.g., the narrow spray pattern 128 in FIG. 5C).

The size of the opening or passageway between the exterior of the needle valve needle 108 and the inner wall of the cavity of the needle valve nozzle 110 is related to the volume of paint that is sprayed from the proportionally controlled cap 100. The more the actuator button 104 is pulled back relative to the main body 102, the larger this opening or passageway becomes which results in a greater volume of paint being sprayed from the proportionally controlled cap 100. Similarly, the more the actuator button 104 is pushed forward relative to the main body 102, the smaller this opening or passageway becomes which results in less volume of paint being sprayed from the proportionally controlled cap 100, until the actuator button 104 is pushed into a full forward position which closes the needle valve 109.

The tapering of the needle valve needle 108 and the inner cavity of the needle valve nozzle 110 as well as the relative position of the needle valve needle 108 and the needle valve nozzle 110 are related to the spray pattern 128 leaving the proportionally controlled cap 100. The stream of paint is forced to exit the proportionally controlled cap 100 through the needle valve 109 and the angle of exit approximately matches the tapering of the needle valve needle 108 where the paint meets at a point outside of the needle valve 109 and is atomized to form the spray pattern 128. With the needle valve needle 108 in a forward position (as illustrated in FIG. 5C), the exit angle of the paint is relatively narrow due to the forward position of the needle valve needle 108 relative to the needle valve nozzle 110. This causes the paint to exit with a narrow spray pattern 128. Similarly, with the needle valve needle 108 in a rear position (as illustrated in FIG. 5D), the exit angle of the paint is relatively wide due to the rearward position of the needle valve needle 108 relative to the needle valve nozzle 110. This causes the paint to exit with a relatively wide spray pattern 128.

ADDITIONAL EMBODIMENTS

As used herein, the terms "proportional control" or "proportionally controlled" can be used to indicate that a change in position of an actuator button relative to a main body causes a change in a spread of spray leaving the cap and does not necessarily indicate a linear or proportional relationship between the position of the actuator button and the main body. Rather, the term proportional is used to indicate a relationship between the relative positions of the actuator button and the main body such that a change in the relative positions causes a change in the spread of spray paint leaving the disclosed caps. The relationship between the relative position of the main body and actuator button and the spread of spray paint can be linear or non-linear, or the relationship can be modeled by another suitable function or mathematical relationship wherein a change in relative position results in a change in the spread of spray paint leaving the cap. Thus, the disclosed caps may also be referred to as variable control caps or variably controlled caps.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A proportionally controlled cap for a spray paint can, the cap comprising:

a main body comprising a bearing block forming a hole, a delivery tube, a valve chamber, and a valve stem that is configured to mate with a corresponding valve feature on the spray paint can to allow paint to flow from the spray paint can to the valve chamber of the proportionally controlled cap through the delivery tube;

an actuator button coupled to the main body, the actuator button including a cap slide rail positioned through the hole in the bearing block of the main body and a slide rail retainer band configured to retain the cap slide rail within the actuator button, the actuator button configured to be pushed down and to slide horizontally relative to the main body, responsive to being pushed down, the actuator button is configured to interact with the valve of the spray paint can to cause paint to flow through the delivery tube to the valve chamber; and a needle valve coupled to the actuator button and fluidly coupled to the valve chamber, the needle valve including a needle valve needle passing through a needle valve nozzle, wherein horizontal movement of the actuator button causes the needle valve needle to move horizontally relative to the needle valve nozzle such that in a full forward position of the needle valve needle, the needle valve needle closes and sliding the actuator button horizontally backward from the full forward position opens the needle valve with a size of an opening of the needle valve being proportional to a horizontal movement distance all along a horizontal distance of travel of the actuator button to provide proportional control of the needle valve, wherein, with the actuator button pressed down and pushed to the full forward position, the valve chamber fills with paint without allowing paint to exit the needle valve, wherein moving the actuator button relative to the main body causes the cap slide rail to slide within the hole formed by the bearing block.

2. The cap of claim 1 further comprising an O-ring seal configured to prevent paint from flowing from the valve chamber backward to the actuator button.

3. The cap of claim 1, wherein sliding the actuator button along the main body toward the needle valve causes the spray pattern to narrow.

4. The cap of claim 3, wherein sliding the actuator button along the main body away from the needle valve causes the spray pattern to widen.

5. The cap of claim 4, wherein the actuator button is configured to slide while paint is exiting the needle valve to change the spray pattern while paint is exiting the needle valve.

6. The cap of claim 1 further comprising a needle locking screw configured to secure the needle valve needle to the actuator button.

7. The cap of claim 1, wherein:

the needle valve nozzle forms a tapered inner cavity, the needle valve needle is tapered, and the tapering of the needle valve needle is configured to match the tapering of the inner cavity of the needle valve nozzle.

8. The cap of claim 7, wherein, in a full forward position of the actuator button, the needle valve is closed due to the exterior of the needle valve needle being seated against the inner wall of the tapered inner cavity of the needle valve nozzle.

9. The cap of claim 7, wherein sliding the actuator button relative to the main body away from the needle valve increases a distance between the exterior of the needle valve needle and the inner wall of the inner cavity of the needle valve nozzle.

10. The cap of claim 7, wherein sliding the actuator button relative to the main body toward the needle valve decreases a distance between the exterior of the needle valve needle and the inner wall of the inner cavity of the needle valve nozzle.

11. The cap of claim 7, wherein the angle of tapering of the needle valve needle and the inner cavity of the needle valve nozzle affects a spray pattern of paint leaving the needle valve.

12. A spray paint can comprising a can holding spray paint and the proportionally controlled cap of claim 1.

13. The spray paint can of claim 12, wherein pressing down on the proportionally controlled cap causes paint to enter the proportionally controlled cap from the spray paint can.

14. The spray paint can of claim 13, wherein, while pressing down on the proportionally controlled cap, sliding the actuator button relative to the main body toward the needle valve causes the spread of the spray paint leaving the proportionally controlled cap to narrow.

15. The spray paint can of claim 13, wherein, while pressing down on the proportionally controlled cap, sliding the actuator button relative to the main body away from the needle valve causes the spread of the spray paint leaving the proportionally controlled cap to widen.

16. The cap of claim 1, wherein in the full forward position, the needle valve needle protrudes out of the needle valve nozzle.

17. The cap of claim 16, wherein sliding the actuator button backward from the full forward position reduces an amount the needle valve needle protrudes out of the needle valve nozzle while still opening the needle valve to allow paint to exit the needle valve.

18. The cap of claim 1, wherein pushing the actuator button down with the actuator button rear of the full forward position is configured to cause paint from the spray paint can to exit the needle valve.

* * * * *